(12) United States Patent
Hattori et al.

(10) Patent No.: US 7,630,043 B2
(45) Date of Patent: Dec. 8, 2009

(54) LIQUID DISPLAY DEVICE AND FABRICATION METHOD THEREOF

(75) Inventors: Takashi Hattori, Musashimurayama (JP); Daisuke Sonoda, Chiba (JP); Daisuke Ryuzaki, Hitachi (JP); Kazuyoshi Torii, Higashimurayama (JP)

(73) Assignee: Hitachi Displays, Ltd., Chiba (JP)

( * ) Notice: Subject to any disclaimer, the term of this patent is extended or adjusted under 35 U.S.C. 154(b) by 170 days.

(21) Appl. No.: 11/777,853

(22) Filed: Jul. 13, 2007

(65) Prior Publication Data

US 2008/0018816 A1    Jan. 24, 2008

(30) Foreign Application Priority Data

Jul. 19, 2006    (JP) .............................. 2006-196375

(51) Int. Cl.
G02F 1/1333    (2006.01)
(52) U.S. Cl. ....................................................... 349/138
(58) Field of Classification Search ........................ None
See application file for complete search history.

(56) References Cited

U.S. PATENT DOCUMENTS

| | | | |
|---|---|---|---|
| 5,953,084 A | 9/1999 | Shimada et al. | |
| 5,953,085 A | 9/1999 | Shimada | |
| 6,466,280 B1* | 10/2002 | Park et al. ...................... | 349/43 |
| 6,717,632 B2* | 4/2004 | Ha et al. ......................... | 349/43 |
| 7,173,313 B2 | 2/2007 | Ronda et al. | |
| 2002/0140887 A1* | 10/2002 | Maeda et al. ................. | 349/113 |
| 2003/0128329 A1* | 7/2003 | Kim ............................. | 349/187 |
| 2004/0001170 A1* | 1/2004 | Chang et al. ................. | 349/106 |

FOREIGN PATENT DOCUMENTS

| | | |
|---|---|---|
| CN | 1515942 A | 7/2004 |
| CN | 1762057 A | 4/2006 |
| JP | 5-61057 A | 3/1993 |
| JP | 5-505247 A | 8/1993 |
| JP | 6-138484 A | 5/1994 |
| JP | 6-160878 A | 6/1994 |
| JP | 6-242433 A | 9/1994 |
| JP | 8-152650 A | 6/1996 |
| JP | 9-90341 A | 4/1997 |
| JP | 9-127548 A | 5/1997 |
| JP | 2000-30534 A | 1/2000 |
| JP | 2000-91585 A | 3/2000 |
| JP | 2000-310793 A | 11/2000 |
| JP | 2001-13518 A | 1/2001 |
| JP | 2003-7135 A | 1/2003 |
| JP | 2003-287883 A | 10/2003 |
| JP | 2003-288813 A | 10/2003 |
| JP | 2004-14297 A | 1/2004 |
| JP | 2006-18326 A | 1/2006 |

* cited by examiner

*Primary Examiner*—Mike Stahl
(74) *Attorney, Agent, or Firm*—Miles & Stockbridge P.C.

(57) ABSTRACT

A liquid crystal display improved with the opening ratio and increased for the storage capacitance, in which a gate insulating film, a gate electrode, an interlayer insulating film, an image line and a source electrode are stacked in this order formed in the layer above an active device formed to a first substrate, the interlayer insulating film is formed with a coatable transparent insulating film having a specific dielectric constant of 4.0 or higher at least containing high dielectric fine particle or sol-gel, a first through hole is formed in the gate insulating film, a second through hole is formed to the interlayer insulating film in the inside of the first through hole, the source electrode is electrically connected with the active device by way of the second through hole, and the storage capacitance is constituted by the gate electrode, the image line, the source electrode, and the interlayer insulating film.

18 Claims, 7 Drawing Sheets

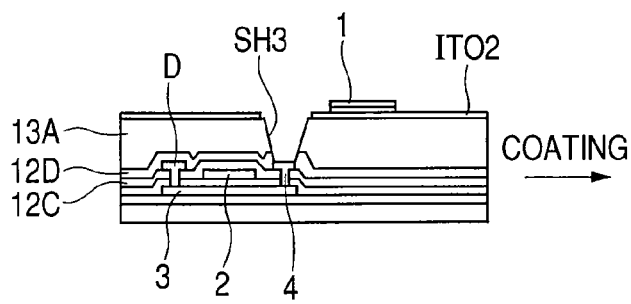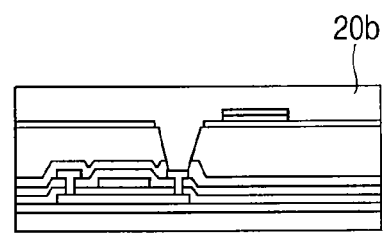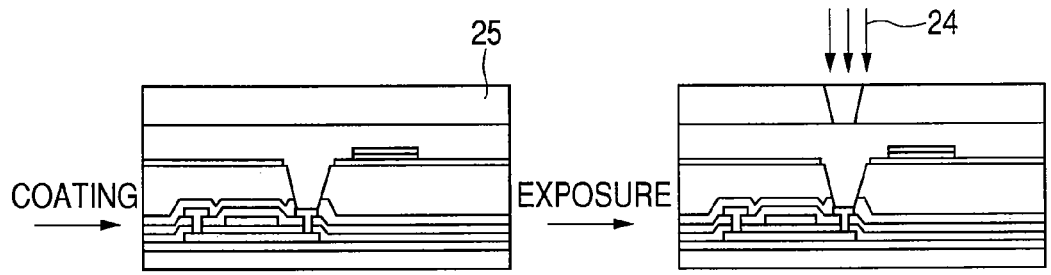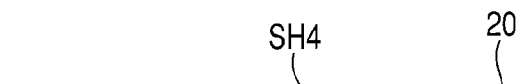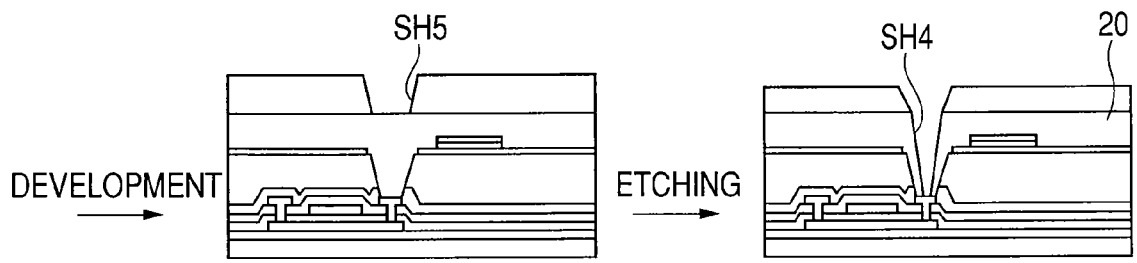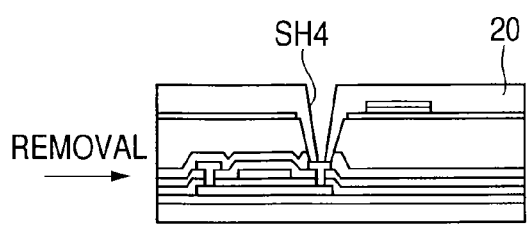

LIQUID DISPLAY DEVICE AND FABRICATION METHOD THEREOF

CLAIM OF PRIORITY

The present application claims priority from Japanese application JP 2006-196375 filed on Jul. 19, 2006, the content of which is hereby incorporated by reference into this application.

FIELD OF THE INVENTION

The present invention concerns a liquid crystal display and a fabrication method thereof and, particularly, it is suitable to a substrate formed with an active device (typically, thin film transistor) of a liquid crystal display panel constituting a display portion of a liquid crystal display.

BACKGROUND OF THE INVENTION

An active matrix type liquid crystal display using active devices typically represented by thin film transistors (TFT) has been popularized generally as various types of displays in view of the feature of reduced thickness and weight and high picture quality. The display system of the liquid crystal display is generally classified into the following two types. One of them is a system of sandwiching liquid crystals between two substrates constituted each with a transparent electrode, conducting operation by a voltage applied to the transparent electrodes and displaying, under modification, a light transmitting the transparent electrode and incident to the liquid crystals, and most of products popularized at present adopt this vertical electric field system.

The other of them is a system referred to as a transverse electric field system or an in-plane switching (IPS) system. The IPS system liquid crystal display panel is adapted to generate a electric field which is parallel with a substrate surface in at least a portion thereof between a pixel electrode and a counter electrode and display images by driving liquid crystals by the electric field thereby modifying a light transmitting a liquid crystal layer, and it has a feature that a field angle is remarkably wide. The feature of the active matrix type liquid crystal display adopting the IPS system is described in JP-T No. 5-505247 and JP-T No. 6-160878 (Patent Documents 1 and 2).

Further, in the IPS system liquid crystal display panel, it has been known a liquid crystal display panel of forming a planar counter electrode and a pixel electrode having a linear portion sandwiching an insulating film, generating an electric field between the planar counter electrode and the pixel electrode having the linear portion, driving the liquid crystal by the electric field and displaying an image by modifying a light transmitting a liquid crystal layer.

Although not particularly relating to the IPS system, prior art documents concerned with the present invention include JP-A Nos. 5-61057 (Patent Document 3), 6-138484 (Patent Document 4), 8-152650 (Patent Document 5), 9-90341 (Patent Document 6), 2000-310793 (Patent Document 7), 2001-13518 (Patent Document 8), 2006-18326 (Patent Document 9), 9-127548 (Patent Document 10), and 6-242433 (Patent Document 11).

Further, as prior art documents concerned with the present invention, 2000-30534 (Patent Document 12), 2003-7135 (Patent Document 13), 2003-287883 (Patent Document 14), 2003-288813 (Patent Document 15), and 2004-14297 (Patent Document 16) disclose photosensitive material containing high-k dielectric fine particles, although they are not concerned particularly with the IPS system.

SUMMARY OF THE INVENTION

In the active matrix type liquid crystal display, an opening ratio has been increased for improving high fineness and saving consumption power. The IPS system liquid crystal panel involves a problem in view of the structure thereof that improvement for the opening ratio is difficult compared with the vertical electric field system.

In the IPS system liquid crystal display panel using the planar counter electrode described above, a storage capacitance (Cst) is formed with the planar counter electrode, the pixel electrode having the linear portion and the insulating film therebetween. The storage capacitance serves to more stably keeping static charges of the pixel electrode. In the IPS system referred to herein, a storage capacitance (Cst) formed so far in a not light transmitting portion is formed in a light transmitting portion as a transparent capacitance film. This can improve the opening ratio. In this case, a capacitor of high transparency, having a large capacitance and a high withstand voltage is indispensable.

The capacitance C of a capacitor is represented by the following formula (1)

$$C = \epsilon_r \epsilon_0 S/d \quad (1)$$

In the formula (1), C: capacitance, $\epsilon_r$: specific dielectric constant, $\epsilon_0$: dielectric constant of vacuum, S: electrode area, d: inter-electrode distance.

Accordingly, for obtaining a large capacitance, it is necessary to use a material of high-k dielectric constant, increase the electrode area or decrease the inter-electrode distance. For the electrode area, since high fineness is also required, the size is limited. Particularly, in a medium-to-small sized display, it is indispensable to decrease the electrode area for making it compatible with higher fineness. Then, decrease of the inter-electrode distance is also limited in view of the problem for the control of the film thickness or the problem of lowering the withstand voltage.

The present invention has been accomplished for overcoming the problems in the prior art and it intends to provide a capacitor of high transparency, having a high capacitance and having a high withstand voltage. The foregoing and other objects and novel features of the present invention will become apparent in view of the descriptions of the specification and the appended drawings to be explained hereinafter.

The outline for the typical constitution of the invention is as described below. That is, a liquid crystal display according to the invention includes:

(1) a first substrate, a second substrate, and liquid crystals put between the first substrate and the second substrate, in which the first substrate includes an active device, a first insulating film disposed to a layer above the active device, a first electrode disposed to a layer above the first insulating film, a second insulating film disposed to a layer above the first electrode, and a second electrode disposed to a layer above the second insulating film, the second insulating film is a coatable transparent insulating layer having a specific dielectric constant of 4.0 or higher, the first insulating film has a first contact hole, the second insulating film is formed between the first electrode and the second electrode, and in the first contact hole, a second contact hole is formed to the second insulating film in the inside of the first contact hole, the second electrode is a pixel electrode, the second electrode is electrically connected by way of the second contact hole with the active device, and a storage capacitance is formed by the first electrode, the second electrode, and the second insulating film.

(2) Further, in (1) according to the invention, the second electrode can be a transparent electrode.

(3) Further, in (1) or (2) according to the invention, the second insulating film can contain at least a transparent film constituting a main material thereof and fine particles having a specific dielectric constant higher than that of the transparent film material.

(4) Further, in (3) according to the invention, the grain size of the fine particles having the specific dielectric constant higher than that of the transparent film material can be 30 nm or less.

(5) Further, in (3) or (4) according to the invention, the fine particles having the specific dielectric constant higher than that of the transparent film material can use the following material (a):

(a) titanium oxide, barium titanate, aluminum oxide, tantalum oxide, zirconium oxide, hafnium oxide, niobium oxide, and yttrium oxide. They may be used each alone or two or more of them may be used in admixture.

(6) Further, in (1) or (2) according to the invention, the second insulating film can be a material at least containing a transparent film constituting a main material thereof and a sol-gel having a specific dielectric constant higher than that of the transparent film material.

(7) Further, in (6) according to the invention, the sol-gel having a specific dielectric constant higher than that of the transparent film material can use the following material (a):

(a) titanium oxide, barium titanate, aluminum oxide, tantalum oxide, zirconium oxide, hafnium oxide, niobium oxide, and yttrium oxide. They may be used each alone or two or more of them may be used in admixture.

(8) Further, in any one of (3) to (7) according to the invention, the transparent film constituting the main material can contain at least a polymer selected from polyacrylate derivatives, polystyrene derivatives, polyolefin derivatives, and copolymers thereof.

(9) Further, in any one of (3) to (7) according to the invention, the transparent film constituting the main material can be a material having photosensitivity.

(10) Further, in any one of (1) to (9) according to the invention, the thickness of the second insulating film can be 100 nm or more and 1000 nm or less.

(11) Further, in any one of (1) to (10) according to the invention, the second insulating film can have a transmittance of 90% or more at a wavelength of 450 nm or more and 800 nm or less.

(12) Further, in any one of (1) to (11) according to the invention, the first electrode can be a transparent electrode.

(13) Further, in any one of (1) to (11) according to the invention, the first electrode can be a reflection electrode.

(14) Further, in (13) according to the invention, the reflection electrode can have unevenness therein.

(15) Further, in any one of (1) to (11) according to the invention, the first electrode can be a transparent electrode and a reflection electrode.

(16) Further, any one of (1) to (15) according to the invention can be adapted such that the first electrode is a counter electrode and the liquid crystals are driven by an electric field generated by the first electrode and the second electrode.

(17) Further, in (16) according to the invention, a slit can be formed to the first electrode.

Further, any one of (1) to (15) according to the invention can be adapted such that the second electrode is a counter electrode and the liquid crystals are driven by an electric field generated by the counter electrode and the second electrode.

(18) Further, in any one of (1) to (18) according to the invention, a third insulating film can be disposed between the first electrode and the second electrode.

(20) Further, in any one of (1) to (19) according to the invention, the surface of the second insulating film can be made planar.

(21) Then, a method of fabricating a liquid crystal display device according to the invention includes a process of:

forming an active device on the main surface of the first substrate, stacking a first insulating film, a first electrode, a second insulating film, and a second electrode in this order in the layer above the active device, forming the second insulating film between the first electrode and the second electrode and in the inside of the first through hole by using a coatable transparent insulating film having a specific dielectric constant of 4.0 or higher, forming a second through hole to the second insulating film in the inside of the first through hole, electrically connecting the second electrode constituting a pixel electrode by way of the second contact hole to the active device, and forming a storage capacitance by the first electrode, the second electrode, and the second insulating film, in which the second insulating film is made photosensitive, and exposure and development in a predetermined pattern are applied to the second insulating film to form the second through holes.

The constitutions described in (1) to (21) above are only examples and the invention is not restricted to them.

[Specific dielectric constant], [material], [fine particles], [grain size], [sol-gel], [photosensitivity], [mixing ratio], [film thickness], [transmittance], [refractive index], [planarity], etc. in the typical constitutional examples of the invention described above are to be explained.

[Specific Dielectric Constant]:

The coatable transparent insulating film having the specific dielectric constant of 4.0 or higher includes those materials containing at least a transparent film constituting the main material thereof, fine particles or a sol-gel having a specific dielectric constant higher than that of the transparent film material. The specific dielectric constant is, preferably, 4.0 or higher and, preferably, 6.0 or higher. The reason is as described below.

That is, fineness has made higher also in a medium-to-small sized liquid crystal displays typically represented by the liquid crystal panel of a mobile telephone and it is considered that QVGA (320×240 pixels) at present will shift to VGA (640×480 pixel) class in the feature. Considering a 2.4 inch (nominal) panel of VGA and assuming that a storage capacitance of 60 fF is necessary and the electrode area thereof is 400 µm². The inter-electrode distance $\underline{d}$ is about 195 nm in a case of using a material having a specific dielectric constant of 4.0 or less, for example, a coatable insulating film such as of an acrylate polymer having a specific dielectric constant of 3.3 known so far according to the relation:

$$C = \epsilon_r \epsilon_0 S/d \qquad (1)$$

(in which C: capacitance, $\in_r$: specific dielectric constant, $\in_0$: dielectric constant of vacuum, S: electrode area, d: inter electrode distance). Accordingly, it is necessary to control the thickness of the coatable insulating film to about 200 nm.

As shown in the formula (1) above, since the capacitance C and the electrode area S are in proportion, the capacitance can be made larger when the electrode area can be enlarged. However, decrease of the electrode area is limited in view of the trend of making the fineness higher as has been described above. Since the inter-electrode distance d is in an inverse proportion to the capacitance, it is possible to improve the capacitance by decreasing the inter-electrode distance (d). However, the withstand voltage and the leakage current provide a problem in this case. Actually, in an organic film at a film thickness of about 200 nm, it may be a high possibility that the withstand voltage and the leak current result in the problem.

On the contrary, in a case of using a material having a specific dielectric constant, for example, of 5.0, the inter-electrode distance is 300 nm according to the formula (1) and this is advantageous in view of the withstand voltage and the leakage current by so much as the thickness can be increased. In a case where the dielectric constant is further higher, the effect is further improved.

[Material] (Organic Polymer):

For the coatable transparent insulating film having a specific dielectric constant of 4.0 or higher used in the invention, the transparent film constituting the main portion thereof includes polyacrylate derivatives, polymethacrylate derivatives, polystyrene derivatives, polyolefin derivatives, and copolymers thereof. Those other than described above can also be used so long as they are highly transparent in a visible region and not colored by a heat treatment at about 200° C. For the molecular weight, those having a weight average molecular weight of about 1,000 to 100,000 are preferred. Such polymers can be used each alone or two or more of them may be used in admixture. The specific dielectric constant of the polymers is about from 3 to 3.5. Further, the polymers can be mixed with a photosensitive ingredient for providing the photosensitivity. Further, a photosensitive ingredient may be directly attached to the polymer.

[Fine Particles]:

In the coatable transparent insulating film having a specific dielectric constant of 4.0 or higher, the fine particles having a specific dielectric constant higher than that of the transparent film material include metal oxides such as titanium oxide ($TiO_2$), aluminum oxide ($Al_2O_3$), barium titanate ($BaTiO_3$), tantalum oxide ($Ta_2O_5$), zirconium oxide ($ZrO_2$), hafnium oxide ($HfO_2$), niobium oxide ($Nb_2O_5$), and yttrium oxide ($Y_2O_3$). Further they also include metal nitrides of high specific dielectric constant, for example, silicon nitride ($Si_3N_4$). Such fine particles may be used each alone, or two or more of them may be used in admixture. The following Table 1 shows dielectric materials and features thereof.

TABLE 1

| High dielectric material | Chemical formula | Specific dielectric constant | Refraction index | Feature |
|---|---|---|---|---|
| Titanium oxide | $TiO_2$ | X, y = 8.1, z = 173 | 2.3-2.55 | Inexpensive, high transparent |
| Barium titanate | $BaTiO_3$ | 1200-2900 | 2.3-2.4 | Extremely high dielectric constant |
| Aluminum oxide | $Al_2O_3$ | 8.5-10 | 1.67 | Inexpensive, high transparent |
| Tantalum oxide | $Ta_2O_5$ | 25 | 2.16 | |
| Zirconium oxide | $ZrO_2$ | 11-18.5 | 2.05 | Highly transparent |
| Hafnium oxide | $HfO_2$ | 24 | 1.95 | |
| Yttrium oxide | $Y_2O_3$ | 11 | 1.87 | |
| Niobium oxide | $Nb_2O_5$ | 46 | 2.33 | |
| Silicon oxide | $Si_3N_4$ | 7-8 | | |

[Grain Size]:

In a case of adding them as fine particles, the primary grain size thereof is, preferably, 30 nm or less and, more preferably, 20 nm or less. In a case where the grain size is larger than that described above, the light scattering effect tends to increase and a transparent film is difficult to obtain. On the other hand, even when the primary grain size is small, agglomeration may cause scattering, those not causing agglomeration are desirable.

Further, depending on the material, some activity is shown sometimes. For example, referring to $TiO_2$, it has been known that crystals of an anatase type show photocatalytic activity. However, since the activity may lead to the deterioration of the material thus giving undesired effects in the application use of the invention, those of a rutile type showing less photocatalytic activity are desired. Further, it is also preferred that the periphery of the particle is covered with a more stable material such as $SiO_2$ or $Al_2O_3$.

For avoiding agglomeration of the fine particles, the fine particle of high-k dielectric material used in the invention is preferably treated with a surface treating agent further at the periphery thereof. The fine particles are coated optionally in admixture with a binder or an organic polymer as the photosensitive ingredient in an appropriate solvent. Accordingly, for improving the dispersibility of them in the solution, those applied with a surface treatment by an appropriate surface treating agent are preferred. Specific surface treating agent includes, for example, silane coupling reagents, polysilicon derivatives and stearic acid.

[Sol-Gel]:

The coatable transparent insulating film having a specific dielectric constant of 4.0 or higher used in the invention may be those containing a sol-gel having a specific dielectric constant higher than that of the transparent film material. The sol-gel includes those of metal oxides sol-gel such as titanium oxide ($TiO_2$), aluminum oxide ($Al_2O_3$), barium titanate ($BaTiO_3$), tantalum oxide ($Ta_2O_5$), zirconium oxide ($ZrO_2$), hafnium oxide ($HfO_2$), niobium oxide ($Nb_2O_5$), and yttrium oxide ($Y_2O_3$). The sol-gel may be used alone or two or more kinds thereof may be used in admixture.

In the case of the sol-gel, since this is not a particle it has less effect of scattering a light and has a feature that a transparent film can be obtained easily. However, in a case where a coatable transparent insulating film having a specific dielectric constant of 4.0 or higher is a photosensitive material, the sol-gel tends to give an effect on the developing property of the film. The sol-gel may also be used together with the fine particles shown previously.

Further, in the case of the sol-gel, it can sometimes form a coating film by itself. Accordingly, in a case where a coatable transparent insulating film having a specific dielectric constant of 4.0 or higher can be formed at a desired film thickness by using the sol-gel alone, the film may be formed by the sol-gel material alone without using an organic polymer as the transparent film constituting the main material.

[Metal Impurity]

It is preferred that the sol-gel as the fine particle used in the invention does not contain alkali metals such as sodium and potassium, alkaline earth metals such as calcium and magnesium and heavy metals such as chromium and lead. The concentration is preferably at a concentration lower than 1 ppm. In a case where imparities are contained in a large amount, the reliability of the formed coatable transparent insulative film is deteriorated. Further, the impurities are diffused to give an undesired effects on the performance of the transistor per se of the thin film transistor.

[Photosensitivity]:

The coatable transparent insulating film having a specific electric constant of 4.0 or higher used in the invention preferably has photosensitivity. It is necessary for the coatable transparent insulating film having a specific dielectric constant of 4.0 or higher of the invention to be formed with a pattern typically represented by through holes. Accordingly, in a case where the film has no photosensitivity, it is necessary for coating and curing the coatable transparent insulating film, then coating additionally a photosensitive photoresist or the like to the upper layer, baking, exposing and developing the same to form a pattern. Further, since it is necessary to etch the coatable transparent insulating film in the lower layer using the resist as a mask, transfer the pattern and, finally, remove the photoresist in the upper layer, this makes the step lengthy.

On the other hand, in a case where the coatable transparent insulating film having a dielectric specific constant of 4.0 or higher has a photosensitivity, since the film per se is sensitive to the light, it can be coated, baked, exposed and developed to form a pattern and the step is completed by the subsequent photo-bleaching and curing. Accordingly, this is advantageous since the pattern can be formed simply and conveniently.

For providing the coatable transparent insulating film with the photosensitivity, the binder for the organic polymer described above includes, for example, those containing at least a polymer using an alkali soluble unit such as a carboxylic acid and a diazonaphthoquinone as a photosensitizer. In such material, since diazonaphthoquinone is decomposed by exposure and transformed into indene carboxylic acid to increase the alkali solubility, the exposed portion is removed by alkali development to obtain a positive type pattern.

Further, the binder of the organic polymer can be incorporated with epoxy units that cause heat crosslinking or polymerizable units such as acrylate units on the side chains for curing the film after forming the pattern by exposure and development.

Another method of providing the photosensitivity, an alkali soluble unit such as a carboxylic acid is used as a binder for the organic polymer described above and a polymer having photo-reactive units groups such as acrylate units or methacrylate units on the side chains are used and a photo-initiator and, optionally, a polyfunctional photo-reactive oligomer are incorporated. By using such a material, photopolymerization is initiated by exposure to cause crosslinking in the exposed portion and a not exposed portion is removed by alkali development to obtain a negative type pattern.

[Photosensitive Sol-Gel]:

In a case of using a sol-gel of a metal oxide as a high-k dielectric material having a specific dielectric constant 5.0 or more, for example, $TiO_2$, $Al_2O_3$, $BaTiO_3$, $Ta_2O_5$, $ZrO_2$, ZnO, $HfO_2$, $Nb_2O_5$, and $Y_2O_3$, since sol-gel can provide by itself a transparent coating film, it can be used as a photosensitive material by incorporation of a photosensitive ingredient thereto. Specifically, a negative type photosensitive composition in which the exposed portion is rendered insoluble can be formed by adding a photo-acid generator such as an onium salt, or sulfonic and imide. Further, a positive type photosensitive composition improving the solubility of the exposed portion can also be formed by a diazonaphthoquinone type material.

[Mixing Ratio]:

The ratio of the fine particles or the sol-gel having a specific dielectric constant higher than that of the transparent film material relative to the transparent film constituting the main body of the invention can be varied optionally between 1/99 to 99/1 (wt %) such that the specific dielectric constant is 4.0 or higher.

[Solvent]:

The solvent for the coatable type transparent insulating film having a specific dielectric constant of 4.0 or higher used in the invention is not particularly restricted so long as it is a solvent that can be coated. For example, the solvent includes propylene glycol monomethyl ether acetate (PGMEA), propylene glycol methyl ether (PGME), diethylene glycol dimethyl ether, diethylene glycol methylethyl ether, cyclohexanone, cyclopentanone, and isoamyl acetate. They may be used each alone or two or more of them may be used in admixture. Further, for preventing streak or unevenness referred to as striation during coating, a surfactant may be incorporated in the solvent.

[High Dielectric Organic Material]:

As the coatable transparent insulating film having a specific dielectric constant of 4.0 or higher used in the invention, organic high-k dielectric materials may be used instead of the fine particles and the sol-gel of metal oxides having high specific dielectric constant, for example, $TiO_2$, $Al_2O_3$, $BaTiO_3$, $Ta_2O_5$, $ZrO_2$, ZnO, $HfO_2$, $Nb_2O_5$, and $Y_2O_3$. The organic high-k dielectric material includes polymers having a large dipole moment such as a cyano-ethyl group.

[Process]:

In a case where the coatable transparent insulating film having a specific dielectric constant of 4.0 or higher used in the invention is photosensitive, the process may include a photo-bleaching step of making the film transparent or a heat treating step for curing. For the photo-breaching step, a step of discoloring and making the film transparent by using UV-light such as i-line (wavelength: 365 nm) at an appropriate exposure dose of from several tens $mJ/cm^2$ to several $J/cm^2$ can be adopted. For the heatcuring step, a step of applying a heat treatment in a nitrogen atmosphere with the oxygen concentration being preferably restricted to several % or less for preventing oxidation, at a temperature from 100° C. to several hundreds ° C. for several tens minutes to several hours can be adopted.

[Film Thickness]:

The coatable transparent insulating film having a specific dielectric constant of 4.0 or higher used in the invention preferably has a film thickness of 100 nm or more and 1000 nm or less. The thickness of the coatable transparent insulating film is in an inverse proportional to a storage capacitance formed therewith as described with reference to the previous formula (1). Accordingly, for increasing the capacitance, the film thickness has to be decreased. However, a larger film thickness is preferred with a view point of the withstand voltage and the leakage current.

[Transmittance]:

The coatable transparent insulating film having a specific dielectric constant of 4.0 or higher used in the invention preferably has a high transmittance. Specifically, it is preferred that the transmittance at the wavelength of 400 nm or more and 800 nm or less for the film thickness to be used is preferably at least 85% or more. The transmittance is, more preferably, 90% or more and, further preferably, 95% or more. With a view point of the transmittance, it is preferred that the film thickness is not unnecessarily large and it is preferably thinner in view of the withstand voltage and within such a range that the leakage current described previously does not increase.

[Refractive Index]:

The coatable transparent insulating film having a specific dielectric constant of 4.0 or higher used in the invention preferably has a high refractive index. Transparent electrodes are disposed in the layers above and below the coatable transparent insulating film. Since the refractive index of ITO which is typical for the transparent electrode is 2.1, it is preferred that the refractive index of the film is near 2.1 since reflection at the boundary between the coatable transparent insulating film and ITO is small. Usually, the refractive index of the interlayer insulating film material comprising the organic polymer used is about from 1.5 to 1.6. On the contrary, high-k dielectric material generally tends to have a high refractive index (refer to Table 1). Accordingly, use of the high-k dielectric material is preferred since the refractive index is increased and the difference of the refractive index relative to ITO can be decreased and the reflection at the boundaries decreased, so that the light transmission efficiency is improved.

[Planarity]:

The coatable transparent insulating film having a specific dielectric constant of 4.0 or higher used in the invention has two advantages that the film can be formed by coating, and a necessary dielectric constant can be obtained even by using the film at a relatively large thickness since the dielectric constant is high. Further, in a case of coating such a material capable of being coated at a relatively large thickness on a stepped substrate, it has also an advantage that the planarity after coating is improved compared with a case of coating at a reduced thickness.

Specifically, in a case of using the reflection electrode described previously, the step formed by the reflection electrode can be absorbed. Further, also in a case where the reflection electrode has an unevenness, the unevenness can be planarized. Accordingly, occurrence of domains due to insufficient rubbing of the aligned film due to the step can be decreased to prevent deterioration of the contrast.

Effects obtained by typical inventions among those disclosed in the present application are to be described simply as below. That is, according to the liquid crystal display of the invention, the storage capacitance can be increased without increasing the electrode area. Accordingly, this leads to the improvement of the opening ratio. Further, since the capacitance can be increased without decreasing inter-electrode distance, the withstand voltage can be increased to decrease the leak current. Further, since this is a coatable type, steps, etc. can be planarized. Further, a material of high dielectric constant generally tends to have a high refractive index and can decrease the reflection at the boundary relative to ITO of high reflective index and constituting a transparent electrode. Therefore, the efficiency of taking out a light is increased. This can provide a liquid crystal display which is increased in the high opening ratio, highly fine and consuming less electric power.

BRIEF DESCRIPTION OF THE DRAWINGS

FIG. 6 is a view showing an example of forming a coatable transparent insulating film (non-photosensitive) shown in FIG. 4;

DETAILED DESCRIPTION OF THE INVENTION

Figure 1:
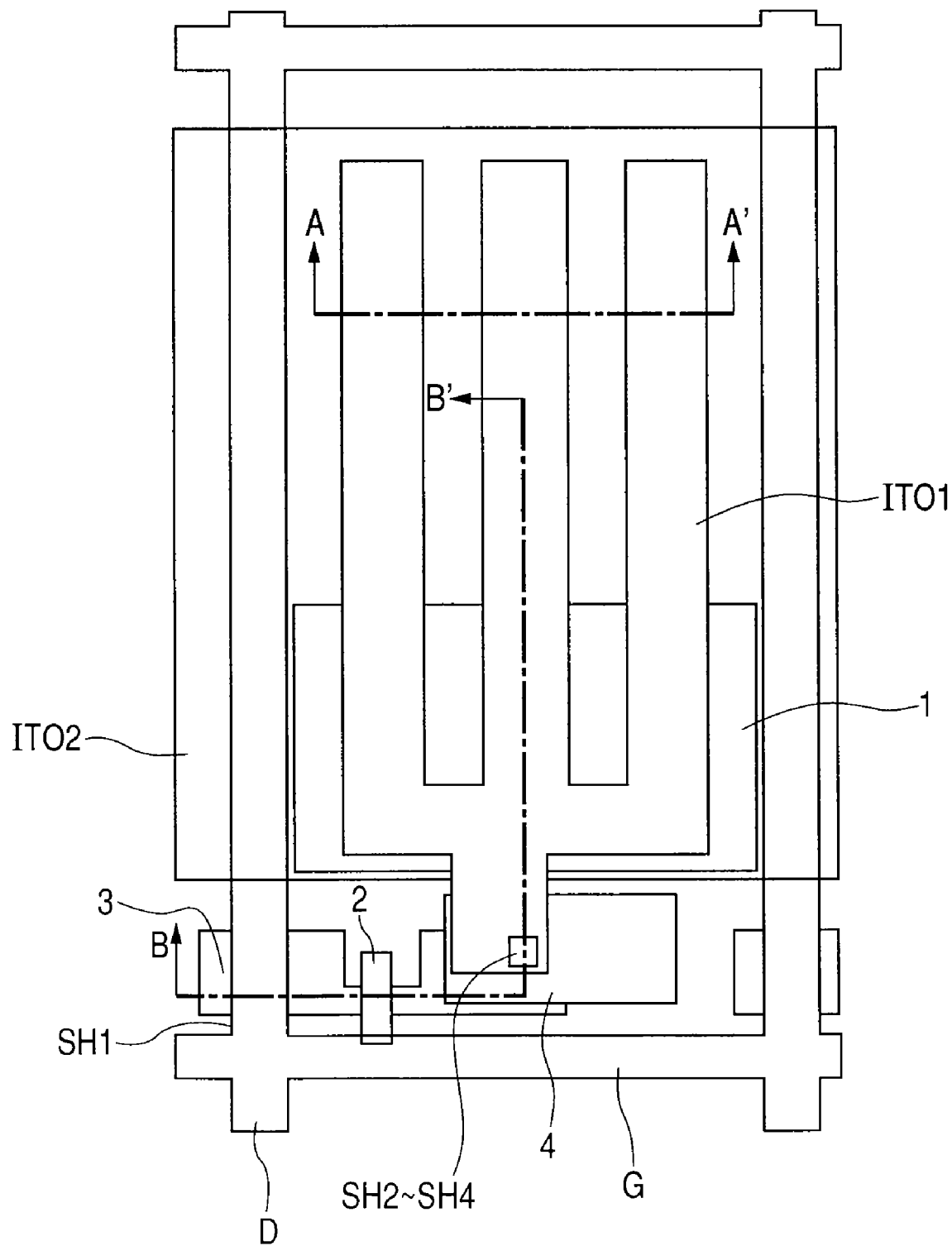
FIG. 1 is a plan vie showing the constitution of a 1 sub-pixel of a liquid crystal display panel according to a preferred example of the invention.

Preferred embodiments of the invention are to be described in details with reference to the drawings. Through out the drawings for explaining the preferred examples of the invention, those having identical functions carry the same reference numerals, for which duplicate descriptions are to be omitted.

Example 1

Example 1 is a specific example for the constituent material used in a liquid crystal display according to the invention and characteristics thereof, as well as for the contents of the processing.

[Material]: Fine $TiO_2$ particle slurry manufactured by Tayca Corp. was added to a commercially available heat resistant transparent photosensitive protective film (Optomer PC452 manufactured by JSR). According to the material safety data sheet (MSDS), Optomer PC452 manufactured by JSR comprises an acrylic resin as a base polymer, naphthoquinone diazido sulfonic acid ester as a photosensitizer, and diethylene glycol methylethyl ether as a solvent and has a solid concentration of 32%. The $TiO_2$ slurry manufactured by Tayca Corp. comprises rutile type fine $TiO_2$ particles (grain size: 20 nm) of less photocatalyst activity dispersed in propylene glycol monomethylethyl ether (PGMEA) as the solvent. The periphery of $TiO_2$ is covered with stable $SiO_2$ and further coated at the periphery thereof with a surface treating agent for dispersion. The slurry had a solid concentration of 28.5% and was an emulsified solution.

The two kinds of the materials were mixed such that Optomer/$TiO_2$ fine particles=90/10, 80/20, 70/30, 60/40, and 50/50 and, optionally diluted with the solvent PGMEA. The obtained solution was an emulsified solution tinted red due to the photosensitizer. The mixed solutions were kept dispersed and precipitation of fine particles was not observed.

[Photosensitive Characteristics]:

The mixed material of Optomer/fine $TiO_2$ particles was rotationally coated on a silicon substrate (or glass substrate), and pre-baked on a hot plate at 90° C. for 3 min to form a coating film of 1.0 μm to 1.5 μm. While the solutions of the mixed materials were emulsified in the state of solution, the coated film turned yellow transparent when coated.

Then, a light of an Xe—Hg lamp was irradiated as an i-line and an illuminance of 7.5 mW/cm$^2$ by way of a short wavelength cut filter UV29 and a filter for 365 nm manufactured by Scott. After exposure, it was developed in an aqueous solution of tetramethyl ammonium hydroxide (2.38%) for 30 to 90 sec. The minimum dose to reduce the residual film thickness to zero was defined as sensitivity $D_0$ (mJ/cm$^2$).

[Photo-Bleaching]:

Coating films of the mixed material of the Optomer/fine $TiO_2$ particles were put to a transparentizing and heat curing treatment referred to as photo-bleaching. After irradiating the pre-baked (90° C., 3 min) coated film by exposure corresponding to i-line shown in the preceding paragraph at 300 mJ/cm$^2$, it was baked in a gas oven under nitrogen (oxygen concentration: 0.5% or less) at 230° C., for one hour to conduct photo-bleaching. The coating film turned colorless transparent by the treatment.

[Optical Characteristic]:

By using the coating film after the photo-bleaching formed on the glass substrate, the transmittance was measured by a visible UV-photospectrometer at 450 nm wavelength (value based on 500 nm film thickness). It was put to polarization analysis. Polarization analysis was conducted by putting a glass substrate deposited with a coated film after the photo-bleaching between two sheets of polarizers, irradiating a light at an irradiation wavelength of 457 nm thereto, and detecting the output of light passing therethrough by a photodiode. In this case, the dependence of the polarizer in the subsequent stage on the angle of rotation was compared by the presence or absence of the specimen to confirm the presence or absence of depolarization. Further, the refractive index was measured by an ellipso meter for the film coated on a silicon substrate and put to photo-bleaching.

[Electric Characteristics]:

An Al electrode of about 3 mm diameter was formed by mask vapor deposition on a coated film after bleaching formed on an N-type silicon substrate and electric characteristics were measured by using the same. A CV meter (measuring frequency at 10 KHz) was used for the measurement of electric capacitance, and a specific dielectric constant was measured based on the measured values. Further, a pA meter/DC voltage source was used for the measurement of leak current. A leak current at an electric field of 0.50 MV/cm was shown.

Table 2 collectively shows the characteristics of mixed materials of the Optomer/fine $TiO_2$ particles measured by the method described above. As shown in Table 2, materials mixed such that Optomer/fine $TiO_2$ particles=90/10, 80/20, 70/30, 60/40, and 50/50 could be alkali-developed, took not so much time for development and showed relatively good photosensitive characteristics. Further, the transmittance (film thickness: 500 nm) at a wavelength of 450 nm after photo-bleaching was high. Further, depolarization of eliminating the polarization was not observed. Further, the refractive index increased, although a little, compared with a case of not adding the fine particles. Also the specific dielectric constant reached 4.0 with addition of 10 wt % and 6.7 with addition of 50 wt % of the fine $TiO_2$ particles. Further, it was also found for the leakage current that it was sufficiently small although increased by about one digit. Table 2 also shows characteristics of the Optomer per se in a case where fine $TiO_2$ particles were not added as Comparative Example 1.

TABLE 2

| No. | Optomer/$TiO_2$ | Sensitivity $D_0$ (mJ/cm$^2$) | Developing time (s) | Transmittance T % @450 nm | Depolarization | Refractive index | Specific dielectric constant | Leak current (pA) |
|---|---|---|---|---|---|---|---|---|
| 1-1 | 90/10 | 60 | 30 | 97 | None | 1.56 | 4.0 | — |
| 1-2 | 80/20 | 80 | 30 | 97 | None | 1.61 | 4.5 | — |
| 1-3 | 70/30 | 100 | 45 | 96 | None | 1.64 | 5.2 | 16 |
| 1-4 | 60/40 | 150 | 70 | 96 | None | 1.71 | 5.9 | — |
| 1-5 | 50/50 | 300 | 90 | 95 | None | 1.77 | 6.7 | 64 |
| Comp. Example 1 | 100/0 | 50 | 30 | 99 | None | 1.53 | 3.5 | 1.6 |

Example 2

Figure 2:
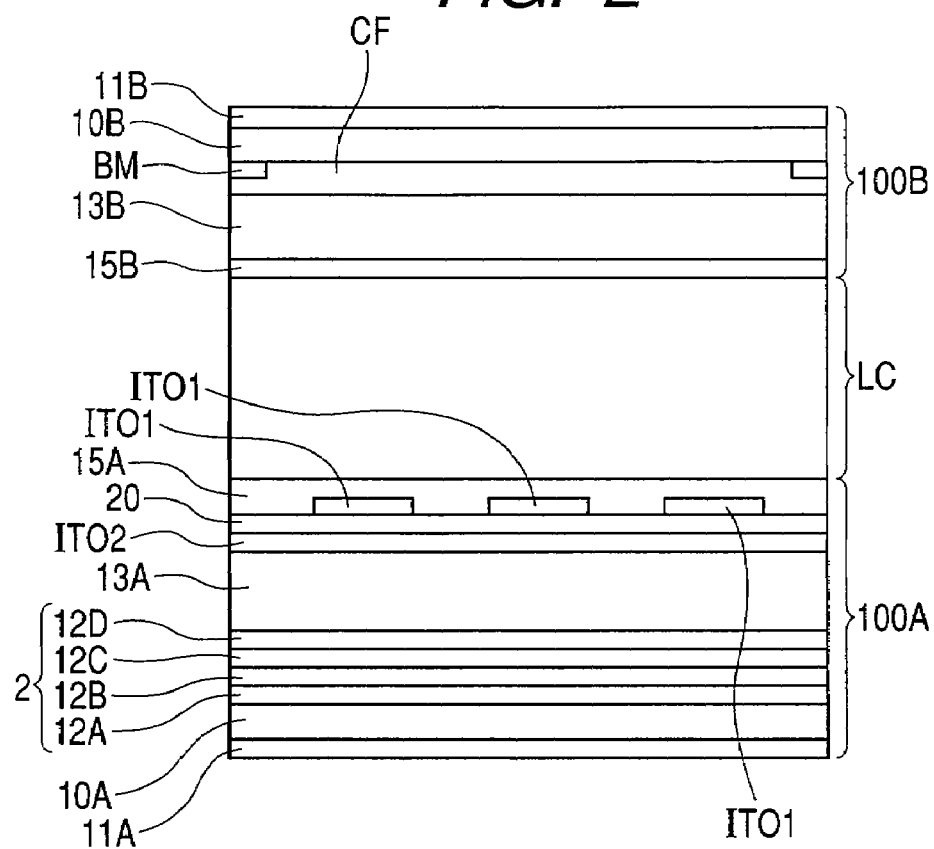
FIG. 2 is a cross sectional view along line A-A' in FIG. 1.

FIG. 1 is a plan view showing the constitution of a 1 sub-pixel of a liquid crystal display panel according to Example 2 of the invention. FIG. 2 is a cross sectional view showing a cross sectional structure along line A-A' in FIG. 1. The liquid crystal display panel of Example 2 is an IPS system liquid crystal display panel using a planar counter electrode. As shown in FIG. 2, it has a transparent substrate (100B) and a transparent substrate (100A) opposed to each other by way of a liquid crystal layer LC. In Example 2, the surface side of the transparent substrate (100B) is a view side.

The transparent substrate (100B) has a glass substrate 10B. On the side of the liquid crystal layer LC of the glass substrate 10B, a light shielding layer (BM), color filter layer (CF), an over coating layer 13B, and an aligned film 15B are formed successively from the glass substrate 10B to the liquid crystal layer LC. Further, a polarizer 11B is formed to the outside of the transparent substrate (100B).

Further, the transparent substrate (100A) has a glass substrate 10A. On the side of the liquid crystal layer LC of the glass substrate 10A, an insulating film 12, an interlayer insulating film 13A, a transparent electrode (ITO2) that functions as an counter electrode, a coatable transparent insulating film 20 having a specific dielectric constant of 4.0 or higher shown in Example 1, a pixel electrode (ITO1), and an aligned film 15A are formed successively from the glass substrate 10A to the liquid crystal layer LC. Further, a polarizer 11A is formed to the outside of the transparent substrate (100A). Further, the insulating film 12 comprises an under layer film 12A, a gate insulating film 12B, an interlayer insulating film 12C, and an interlayer insulating film 12D.

Referring again to FIG. 1, there are shown an image line D (also referred to as a drain line or source line), a scanning line G (also referred to as a gate line), through holes SH1-SH4 (also referred to as contact holes), a reflection electrode 1, a gate electrode 2, a semiconductor layer 3, a source electrode 4 (also referred to as a drain electrode in a case of describing the image line D as the source line). The reflection electrode 1 is formed as a dual layer structure comprising molybdenum (Mo) (1a) of a lower layer and an aluminum (Al) (1b) of an upper layer.

Figure 3:
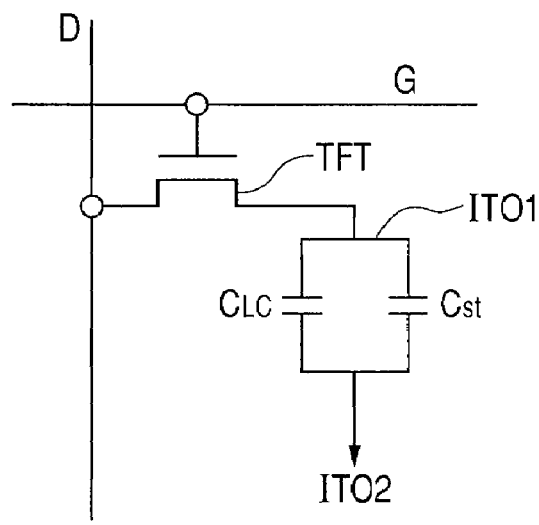
FIG. 3 is an equivalent circuit diagram for FIG. 1.

FIG. 3 is a view showing an equivalent circuit of FIG. 1. A capacitor ($C_{LC}$) in FIG. 3 is a liquid crystal capacitance and a capacitor (Cst) is a storage capacitance (also referred to as a storage capacitance) formed between a pixel electrode (ITO1) and a transparent electrode (ITO2) that functions as the counter electrode that are formed on both sides of the coatable transparent insulating film 20 having a specific dielectric constant of 4.0 or higher.

In an actual liquid crystal display panel, in a case where the equivalent circuit shown in FIG. 3 is a liquid crystal color display panel used, for example, in a mobile telephone, sub-pixels are arranged in a matrix by the number of 240×320×3. Since the driving method for driving the liquid crystal display of Example 2 is identical with that for the IPS system liquid crystal display, description for the driving method is not shown.

The liquid crystal display panel of Example 2 is a translucent liquid crystal display panel in which a region formed with the reflection electrode 1 constitutes a reflection type liquid crystal display panel and other portions constitute a transmission type liquid crystal display panel.

The constitution for the portion of the thin film transistor shown in FIG. 1 is to be described.

Figure 4:
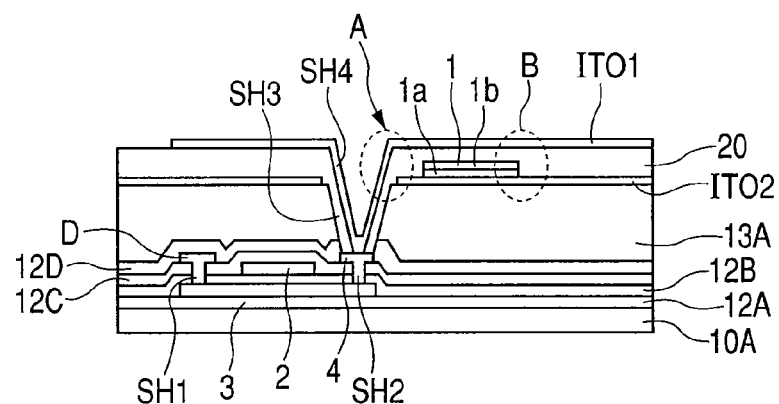
FIG. 4 is a cross sectional view on the side of a transparent substrate along line B-B' shown in FIG. 1.

FIG. 4 is a cross sectional view showing the structure on the side of the transparent substrate (100A) taken along line B-B' in FIG. 1. In FIG. 4, the polarizer 11A is not illustrated.

As shown in FIG. 4, a semiconductor layer 3 is formed on an under layer film 12A comprising, for example, a stacked film of SiN and $SiO_2$ formed on the glass substrate 10A. The semiconductor layer 3 is constituted with an amorphous silicon film or a polysilicon film.

A gate insulating film 12B comprising, for example, $SiO_2$ is formed on the semiconductor layer 3 and a gate electrode 2 is formed on the gate insulating film 12B. An interlayer insulating film 12C comprising, for example, $SiO_2$ or SiN is formed on the gate electrode 2 and an image line (D) and a source electrode 4 are formed on the interlayer insulating film 12C. Then, the semiconductor layer 3 is connected by way of a through hole (SH1) to the image line (D) and further connected to the source electrode 4 by way of a through hole (SH2).

Further, an interlayer insulating film 12D comprising, for example, $SiO_2$, SiN, etc. is formed on the image line (D) and the source electrode 4. An interlayer insulating film 13A comprising, for example, an acrylic resin is formed on the interlayer insulating film 12D. A through hole (SH3) is formed in the interlayer insulating film 12D and the interlayer insulating film 13A above the source electrode 4.

In Example 2, a coatable transparent insulating film 20 having a specific dielectric constant of 4.0 or higher shown in Example 1 is formed also in the through hole (SH3). A through hole (SH4) is formed to the coatable transparent insulating film 20 having a specific dielectric constant of 4.0 or higher shown in Example 1 formed in the inside of the through hole (SH3). A pixel electrode (ITO1) is electrically connected with the source electrode 4 by a transparent conductive film (for example, ITO; Indium-Tin-Oxide) formed in the through hole (SH4).

As described above, the pixel electrode (ITO1) is electrically connected with the active device formed to the pixel. Then, image signals are written from the image line (D) by way of the active device driven by the scanning line (G) into the pixel electrode (ITO1).

In a case of using the coatable transparent insulating film 20 having a specific dielectric constant of 4.0 or higher as shown in Example 1, since the dielectric constant thereof is high, a necessary storage capacitance can be obtained even when the electrode area is small. Further, a necessary capacitance can be obtained for a somewhat thick film thickness and, as a result, this increases the process margin. Further, since a film of somewhat large thickness can be used, even when the portion of the reflection electrode 1 contains a step, the film can be formed while planarizing the step. Accordingly, short-circuit between the pixel electrode (ITO1) and the transparent electrode (ITO2) that functions as the counter electrode can be prevented for the portion shown by arrow A in FIG. 4. Further, as a result, the formed surface of the coatable transparent insulating film 20 having a specific dielectric constant of 4.0 or higher can be planarized. This can prevent occurrence of domains due to insufficient rubbing to improve the contrast.

On the contrary, in a case where the specific dielectric constant is less than 4, it is necessary to increase the electrode area or reducing the film thickness. In a case where the electrode area is increased, it result in a problem that fineness can not be improved or the opening ratio is lowered. In a case where the film thickness is reduced, this results in a problem of withstand voltage or a possibility that the step of the reflection electrode 1 can not be eliminated.

An example of forming the coatable transparent insulating film 20 shown in FIG. 4 is to be described. FIG. 5 is a view showing an example for a method of forming the coatable transparent insulating film (photosensitive) shown in FIG. 4. Further, FIG. 6 is a view showing an example for a method of forming the coatable transparent insulating film (non-photosensitive) shown in FIG. 4.

Figure 5A:
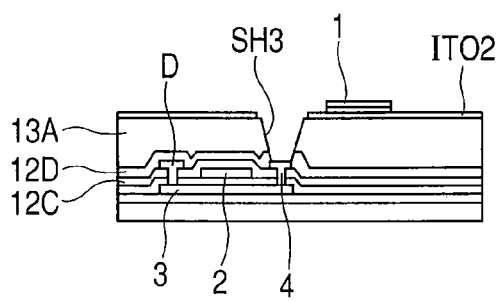
FIG. 5 is a view showing an example of forming a coatable transparent insulating film (photosensitive) shown in FIG. 4.
Figure 5B:
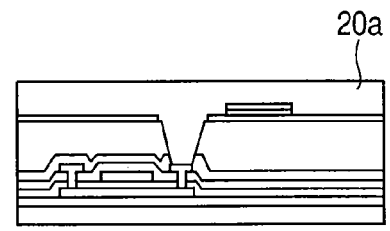
Figure 5C:
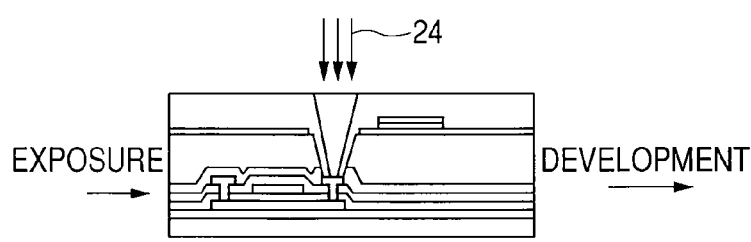
Figure 5D:
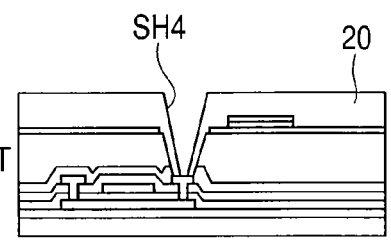

At first, as shown in FIG. 5A, an underlayer film 12A, a semiconductor layer 3, a gate insulating film 12B, a gate electrode 2, an interlayer insulating film 12C, an image line (D), a source electrode 4, an interlayer insulating film 12D, and an interlayer insulating film 13A are formed above a glass substrate 10A by a usual method. A through hole (SH3) is formed to the interlayer insulating film 12D and the interlayer insulating film 13A above the source electrode 4. Then, a coatable transparent insulating film (photosensitive) 20a is coated and pre-baked (FIG. 5B).

Then, as shown in FIG. 5 C, the coatable transparent insulating film (photosensitive) 20a is exposed to a predetermined pattern by an exposure light 24 to form latent images. Subsequently, baking and development are conducted optionally after exposure to form a through hole (SH4) as shown in FIG. 5D and, further, a curing treatment referred to as photo-bleaching is conducted optionally to form a coatable transparent insulating film 20. As described above, in a case where the coatable transparent insulating material has the photosensitivity, the through hole (SH4) can be formed simply.

On the other hand, in a case where the coatable transparent insulating material is not photosensitive, the number of steps increases as shown in FIG. 6. At first, as shown in FIG. 6A, an underlayer film 12A and a semiconductor film 3, a gate insulating film 12B and a gate electrode 2, an interlayer insulating film 12C, an image line (D) and a source electrode 4, an interlayer insulating film 12D, and an interlayer insulating film 13A are formed above a glass substrate 10A by a usual method. A through hole (SH3) is formed to the interlayer insulating film 12D and the interlayer insulating film 13A above the source electrode 4. Then, a coatable transparent insulating material (non-sensitive) 20b is coated and pre-baked. Optionally, a heat treatment is further applied at a high temperature to cause curing (FIG. 6B).

Then, a commercially available photoresist 25 is coated to an upper portion and pre-baked (FIG. 6C). Then, as shown in FIG. 6D, a photoresist 25 is exposed to a predetermined pattern by an exposure light 24 to form latent images. Subsequently, baking after exposure is conducted optionally and then development is applied to form a through hole (SH5) as shown in FIG. 6E.

Then, etching such as dry etching is conducted using the resist pattern as a mask to transfer the pattern of the through hole to the coatable transparent insulating material (non-photosensitive) 20b in the lower layer to form a through hole (SH4) (FIG. 6F). Then, by removing the photoresist, a coatable transparent insulating film 20 having the through hole (SH4) can be formed (FIG. 6G).

Figure 7:
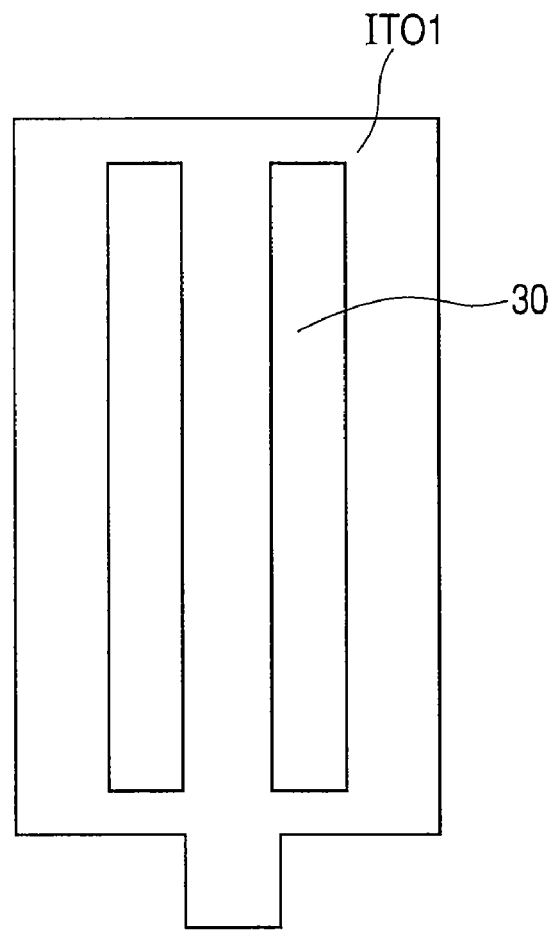
FIG. 7 is a view showing a modified example of a pixel electrode.

In Example 2, the pixel electrode (ITO1) may be in a rectangular shape having slits 30 of a closed shape in the inside as shown in FIG. 7 instead of a comb-shape having slits of a partially opened shape as shown in FIG. 1. In any of the cases of FIG. 1 and FIG. 7, the pixel electrode is in a structure having a linear portion.

Figure 8:
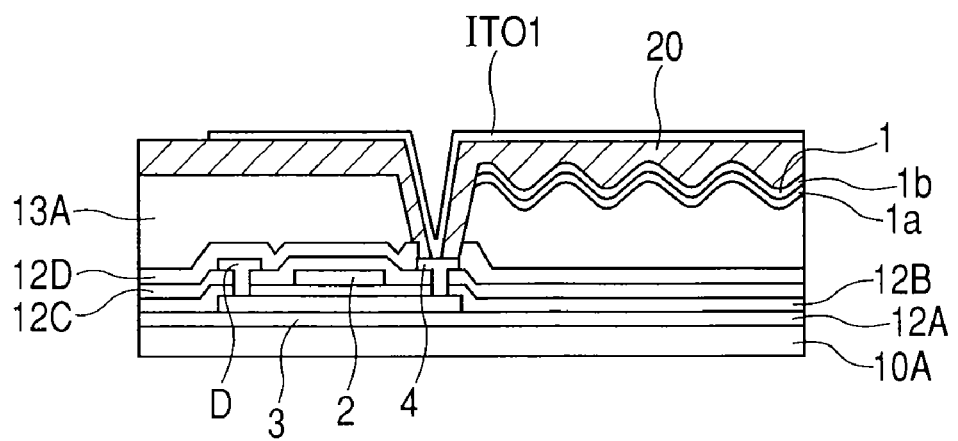
FIG. 8 is a cross sectional view on the side of a transparent substrate for a modified example of a liquid crystal display panel according to a preferred example of the invention.

FIG. 8 is a cross sectional view showing a cross sectional structure on the side of the transparent substrate (100A) of a modified example of the liquid crystal display panel in this example. FIG. 8 is a cross sectional view showing the cross sectional structure for a portion corresponding to a line along B-B' shown in FIG. 1. In the structure shown in FIG. 8, unevenness is formed to the reflection electrode 1 for diffusing and reflecting a light incident to the reflecting electrode 1. Also in such a structure, the unevenness on the reflection electrode 1 can be absorbed to planarize the surface of the coatable insulating film 20.

In the structure in FIG. 8, while the counter electrode is not illustrated, the counter electrode is disposed on the side of the transparent substrate (100A) in a case of a usual IPS system liquid crystal display panel and is formed on the side of the transparent substrate (100B) in a case of a liquid crystal display panel of a vertical electrode film system (for example, TN system, or VA system). Further, in a case of the IPS system, the reflection electrode 1 may serve also as the counter electrode.

As described above, this example is not restricted to the IPS system liquid crystal display panel using the planar counter electrode and is also applicable to a usual IPS system liquid crystal display panel or a vertical electric field system liquid crystal display panel. In this case, the transparent electrode (ITO2) or the reflection electrode 1 is used as an electrode for forming a storage capacitance (Cst) relative to the pixel electrode (ITO1). In the case of the vertical electric field system liquid crystal display panel, the pixel electrode (ITO1) may be a shape not having slits, or slits may be formed to form a multi-domain arrangement.

Figure 9:
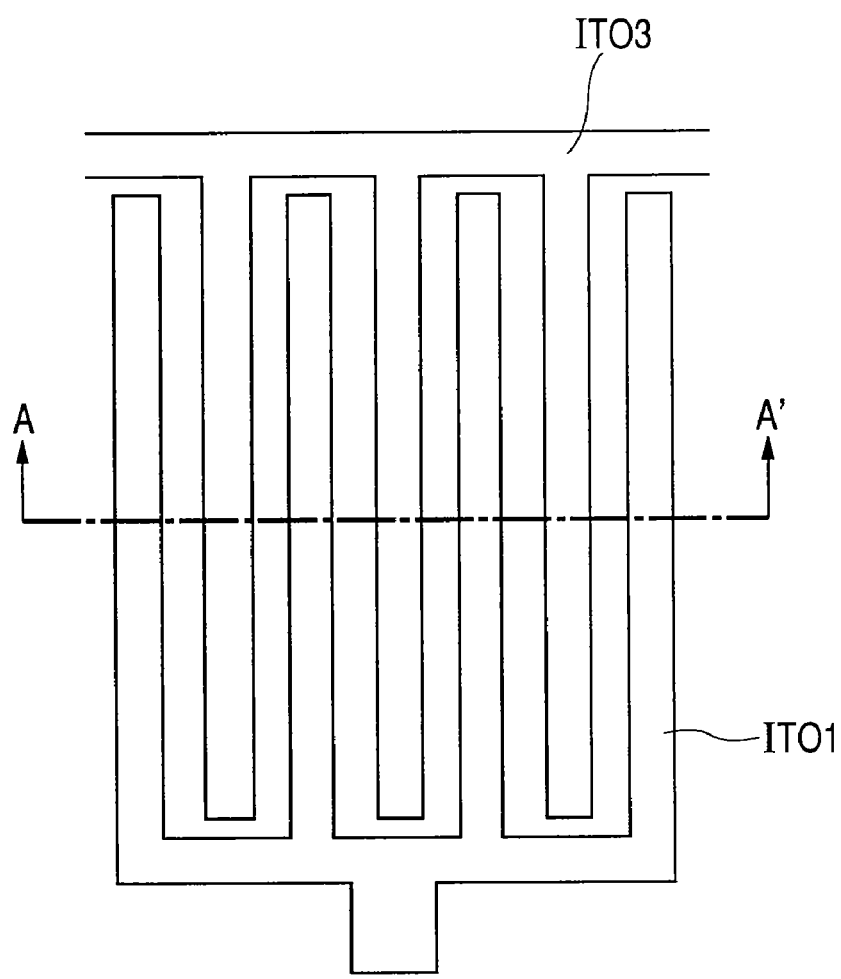
FIG. 9 is a plan view showing the constitution of a 1 sub-pixel of a modified example of a liquid crystal display panel according to a preferred example of the invention.
Figure 10:
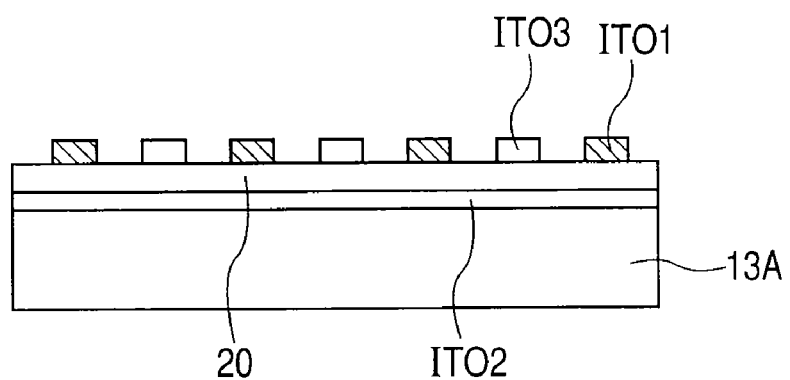
FIG. 10 is a cross sectional view along line A-A' shown in FIG. 10.

FIG. 9 is a plan view showing the constitution of the 1 sub-pixel of a modified example of a liquid crystal display panel according to the example of the invention. FIG. 10 is a cross sectional view showing a structure along line A-A' in FIG. 9. The structure shown in FIG. 9 and FIG. 10 illustrates a structure in a case of applying the invention to a usual IPS system liquid crystal display panel.

In FIG. 9 and FIG. 10, ITO3 denotes a counter electrode. In FIG. 10, the structure below the transparent electrode (ITO2) on the side of the glass substrate 10A is not illustrated except for the interlayer insulating film 13A. Also in FIG. 10, the transparent electrode (ITO2) has a role of the counter electrode and a role of forming a storage capacitance.

Figure 11:
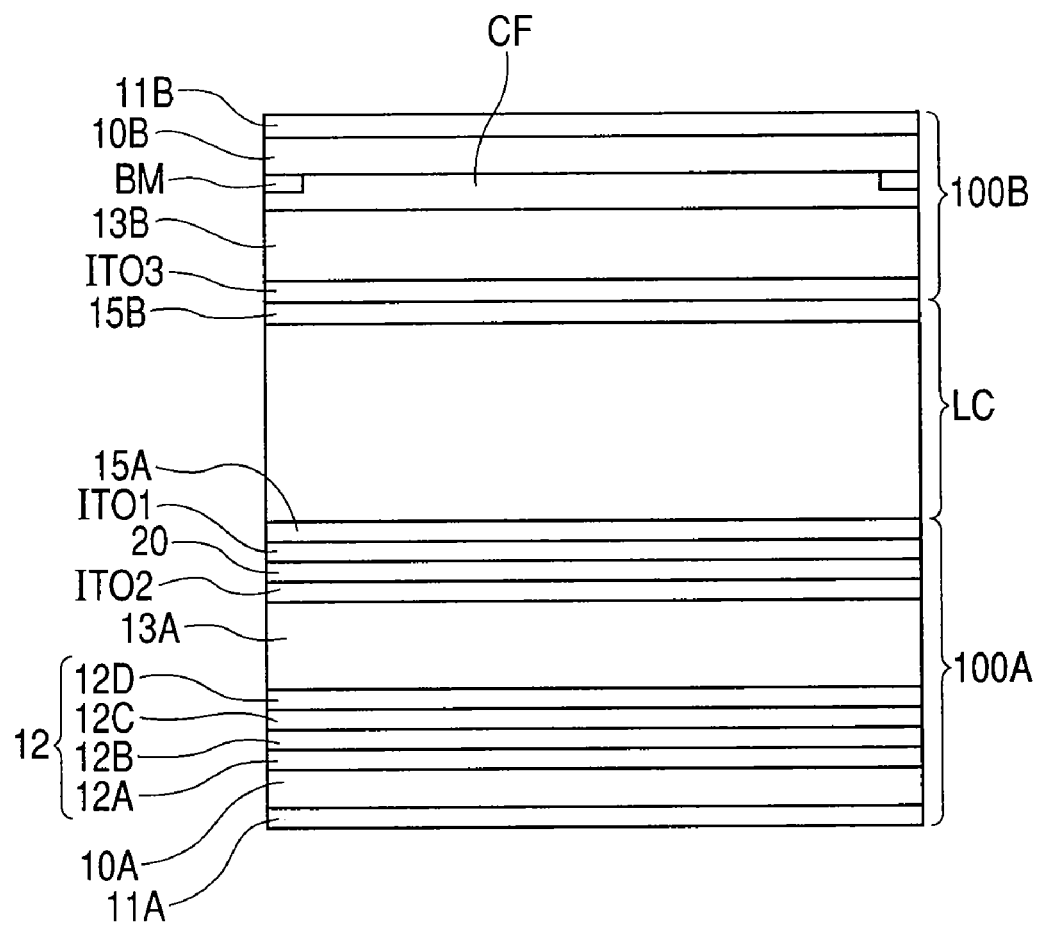
FIG. 11 is a cross sectional view showing a constitution for a modified example of a liquid crystal display panel according to a preferred example of the invention.

FIG. 11 is a cross sectional view showing the structure of a modified example of a liquid crystal display panel of Example 2. FIG. 11 is a cross sectional view showing a cross sectional structure for a portion corresponding to line A-A' shown in FIG. 1. The structure shown in FIG. 11 illustrates a structure in a case of applying the invention to a vertical electric field system liquid crystal display panel.

In the vertical electric field system liquid crystal display panel, the counter electrode (ITO3) (also referred to as a common electrode) is formed on the side of the transparent substrate (100B). Further, the transparent electrode (ITO2) has a role of forming the storage capacitance. The reflection electrode 1 may be formed in combination with the constitution described for FIG. 8.

While the invention has been described specifically with reference to the preferred embodiments, the invention is not restricted to the examples described above but it will be apparent that the invention can be modified variously within a range not departing the technical concept of the invention. For example, the invention may be applied not to the translucent type but to the transparent type or reflection type liquid crystal display. In a case of transparent type, the reflection electrode 1 can be saved. In a case of the reflection type, the reflection electrode 1 may be formed instead of the transparent electrode (ITO2).

In a case of the transparent type or translucent type, a not illustrated back light may be disposed at the back of the liquid crystal display panel. Further, in a case of the reflection type, a not illustrated front light may be disposed at the front surface of the liquid crystal display panel (on the side of a viewer). Further, the invention is not restricted to the liquid crystal display but is applicable also to other displays having an active device and a storage capacitance.

Example 3

In each of the following examples, description is to be made for specific examples of the materials for the transparent film for forming the capacitance. In Example 3, like in Example 1, fine particles or sol-gel of a high dielectric constant material shown in Table 3 were added to a commercially available heat resistant transparent photosensitive protective film (for example, Optomer PC452 manufactured by JSR) at the mixing ratio in Table 3 to form coatable transparent insulating film having a specific dielectric constant of 4.0 or higher. In this case, the mixing ratio (x/y) for Optomer (x)/fine particle or sol-gel (y) is shown by the solid concentration. Samples No. 2-1 to No. 2-12 in Table 3 were evaluated for the characteristics in the same manner as in Example 1 and the results are shown in Table 4.

As shown in Table 4, lowering of the sensitivity was sometimes observed compared with a case of adding nothing. Particularly, lowering of the sensitivity was observed in a case of using the sol-gel. In any of the cases, transparent coating films were obtained and those of specific dielectric constant of 4.0 or higher were also obtained. By using the materials described above, image display as in Example 2 could be prepared.

TABLE 3

| No. | Form | Manufacturer | High dielectric material | Specific dielectric constant | Solvent | Grain size (nm) | Mixing ratio (x/y) |
|---|---|---|---|---|---|---|---|
| 2-1 | Slurry | Tayka Corp. | $TiO_2$ | x, y = 8.1, z = 173 | PGME | 20 | 70/30 |
| 2-2 | Slurry | Tayka Corp. | $TiO_2$ | x, y = 8.1, z = 173 | PGME | 20 | 60/40 |
| 2-3 | Slurry | Own-products | $BaTiO_3$ | 1200-2900 | PGMEA | 20 | 95/5 |
| 2-4 | Slurry | Own-products | $BaTiO_3$ | 1200-2900 | PGMEA | 20 | 90/10 |
| 2-5 | Sol-gel | Pure Chemical Co. | $TiO_2$ | x, y = 8.1, z = 173 | EtOH | — | 90/10 |
| 2-6 | Sol-gel | Pure Chemical Co. | $Al_2O_3$ | 8.5-10 | IAA | — | 70/30 |
| 2-7 | Sol-gel | Pure Chemical Co. | $BaTiO_3$ | 1200-2900 | IAA | — | 95/5 |
| 2-8 | Sol-gel | Pure Chemical Co. | $Ta_2O_5$ | 25 | IAA | — | 90/10 |
| 2-9 | Sol-gel | Pure Chemical Co. | $ZrO_2$ | 11-18.5 | BA | — | 90/10 |
| 2-10 | Sol-gel | Pure Chemical Co. | $HfO_2$ | 24 | IAA | — | 90/10 |
| 2-11 | Sol-gel | Pure Chemical Co. | $Y_2O_3$ | 11 | IAA | — | 90/10 |
| 2-12 | Sol-gel | Pure Chemical Co. | $Nb_2O_5$ | 46 | BA | — | 90/10 |

Solvent PGME: Propylene glycol monomethyl ether
PGMEA: Propylene glycol monomethyl ether acetate
IAA: Isoamyl acetate
BA: Butyl acetate
EtOH: Ethanol

TABLE 4

| No. | Mixing ratio (x/y) | Sensitivity $D_0$ (mJ/cm$^2$) | Transmittance T % at 450 nm | Depolarization | Specific dielectric constant | Leak current (pA) |
|---|---|---|---|---|---|---|
| 2-1 | 70/30 | 100 | 97 | None | 5.2 | 18 |
| 2-2 | 60/40 | 160 | — | None | 5.9 | 35 |
| 2-3 | 95/5 | 50 | 96 | None | 11 | 5.5 |
| 2-4 | 90/10 | 60 | 95 | None | 20 | 8.2 |
| 2-5 | 90/10 | 100 | 98 | None | 4.0 | 10 |
| 2-6 | 70/30 | 150 | 98 | None | 5.1 | 19 |
| 2-7 | 95/5 | 500 | 98 | None | 8.3 | 3.7 |
| 2-8 | 90/10 | 500 | 98 | None | 5.6 | 7.6 |
| 2-9 | 90/10 | 500 | 98 | None | 4.2 | 6.3 |
| 2-10 | 90/10 | 500 | 95 | None | 5.5 | 5.9 |
| 2-11 | 90/10 | 500 | 95 | None | 4.3 | 7.7 |
| 2-12 | 90/10 | 60 | 95 | None | 7.5 | 8.1 |

Transmittance: value at 500 nm thickness.

Example 4

20 parts by weight of 2,3,4-trihydroxybenzophenone-1,2-naphtoquinone diazide-5-sulfonate ester and 240 parts by weight of propylene glycol monomethyl ether acetate were mixed with 100 parts by weight of a resin obtained by copolymerizing 20 parts by weight of methacrylic acid, 40 parts by weight of glycidyl methacrylate, 10 parts by weight of styrene, 20 parts by weight of tricyclodecanyl methacrylate, and 10 parts by weight of 1,3-butadiene to form a solution. The solution was filtered through a TEFLON® filter (TEFLON: registered trademark) of 0.2 µm pore size to form a resist solution (I) of 33% solid content. This was mixed with the sol-gel of fine particles used in Example 1 and Example 3 (Table 5).

In this case, the mixing ratio (x/y) of the own-formulated material (I) (x)/fine particle or sol-gel (y) was shown by a solid content concentration. By using the mixtures, a coatable transparent insulating film having a dielectric constant of 4.0 or higher was formed in the same manner as in Example 1. Samples No. 3-1 to No. 3-6 in Table 5 were evaluated for characteristics in the same manner as in Example 1. For No. 3-6, both of 20 parts by weight of the fine $TiO_2$ particles of Tayka Corp. and 5 by weight of sol-gel of $BaTiO_3$ of Pure Chemical Co. were added to 77 parts by weight of the photosensitive material (solid content). The results are shown in Table 6. In any of the cases, transparent coated films were obtained and those of the specific dielectric constant of 4.0 or higher were also obtained. By using the coatable transparent insulating film, image displays could be prepared in the same manner as in Example 2.

TABLE 5

| No. | Form | Manufacturer | High dielectric material | Specific dielectric constant | Solvent | Grain size (nm) | Mixing ratio (x/y) |
|---|---|---|---|---|---|---|---|
| 3-1 | Slurry | Tayka Corp. | $TiO_2$ | x, y = 8.1, z = 173 | PGMEA | 20 | 70/30 |
| 3-2 | Slurry | Own-products | $BaTiO_3$ | 1200-2900 | PGMEA | 20 | 90/10 |
| 3-3 | Sol-gel | Pure Chemical Co. | $BaTiO_3$ | 1200-2900 | IAA | — | 95/5 |
| 3-4 | Sol-gel | Pure Chemical Co. | $ZrO_2$ | 11-18.5 | BA | — | 90/10 |
| 3-5 | Sol-gel | Pure Chemical Co. | $Nb_2O_5$ | 46 | BA | — | 90/10 |
| 3-6 | Slurry/ Sol-gel | Tayka Corp./ Pure Chemical Co. | $TiO_2$ $BaTiO_3$ | x, y = 8.1, z = 173 1200-2900 | PGMEA IAA | 20 — | 77/20/3 |

Solvent
PGMEA: Propylene glycol monomethyl ether acetate
IAA: Isoamyl acetate
BA: Butyl acetate

TABLE 6

| No. | Mixing ratio (x/y) | Sensitivity $D_0$ (mJ/cm$^2$) | Transmittance T % at 450 nm | Depolarization | Specific dielectric constant | Leak current (pA) |
|---|---|---|---|---|---|---|
| 3-1 | 70/30 | 100 | 96 | None | 5.0 | 20 |
| 3-2 | 90/10 | 110 | 94 | None | 17 | 24 |
| 3-3 | 95/5 | 200 | 95 | None | 10 | 7.0 |
| 3-4 | 90/10 | 60 | 94 | None | 4.1 | 6.0 |
| 3-5 | 90/10 | 100 | 93 | None | 7.4 | 8.0 |
| 3-6 | 77/20/3 | 100 | 94 | None | 8.2 | 15 |

Transmittance: value at 500 nm thickness.

Example 5

Example 5 is a negative type acrylic coating material. 100 parts by weight of poly(methyl methacrylate-acrylic acid-hydroxyethyl acrylate) (molar ratio: 70:20:10, number average molecular weight: 13,000, molecular weight distribution Mw/Mn=1.65), 40 parts by weight of pentaerythritol triacrylate, 10 parts by weight of 2,2-dimethoxy-2-phenylacetophenone, and one part by weight of 2,2,6,6-tetramethyl-1-pyperidinyloxy were dissolved into 300 parts by weight of propylene glycol methyl ether acetate (PGMEA) as a solvent.

The solution was filtered through a TEFLON® filter of 0.2 μm pore size to form a resist solution (II) of 33% solid content. The resist solution was used instead of the resist solution in Example 4 and mixed with the sol-gel of the fine particles used in Example 4 (Table 7). In this case, the mixing ratio (x/y) of the own-formulated material (II) (x)/fine particles or sol-gel(y) was shown by the solid concentration.

Using the mixture, coatable transparent insulating film having a specific dielectric constant of 4.0 or higher was formed in the same manner as in Example 1. This material is a negative type material in which the exposed portion is rendered insoluble, and an aqueous solution of 1.2% tetramethyl ammonium hydroxide containing 0.05% of polyoxyethylene was used as a surfactant for the development.

Samples No. 4-1 to No. 4-5 in Table 7 were evaluated for the characteristics in the same manner as in Example 1. Results are shown in Table 8. The sensitivity shows $D_{50}$ where the residual film thickness is reduced to 50%. In any of the cases, transparent coated films were obtained and those of the specific dielectric constant of 4.0 or higher was also obtained. By using the coatable transparent insulating film, image displays could be prepared in the same manner as in Example 2.

TABLE 7

| No. | Form | Manufacturer | High dielectric material | Specific dielectric constant | Solvent | Grain size (nm) | Mixing ratio (x/y) |
|---|---|---|---|---|---|---|---|
| 4-1 | Slurry | Tayka Corp. | $TiO_2$ | x, y = 8.1, z = 173 | PGMEA | 20 | 70/30 |
| 4-2 | Slurry | Own-products | $BaTiO_3$ | 1200-2900 | PGMEA | 20 | 90/10 |
| 4-3 | Sol-gel | Pure Chemical Co. | $BaTiO_3$ | 1200-2900 | IAA | — | 95/5 |
| 4-4 | Sol-gel | Pure Chemical Co. | $ZrO_2$ | 11-18.5 | BA | — | 90/10 |

TABLE 7-continued

| No. | Form | Manufacturer | High dielectric material | Specific dielectric constant | Solvent | Grain size (nm) | Mixing ratio (x/y) |
|---|---|---|---|---|---|---|---|
| 4-5 | Sol-gel | Pure Chemical Co. | Nb$_2$O$_5$ | 46 | BA | — | 90/10 |

Solvent
PGMEA: Propylene glycol monomethyl ether acetate
IAA: Isoamyl acetate
BA: Butyl acetate

TABLE 8

| No. | Mixing ratio (x/y) | Sensitivity D$_0$ (mJ/cm$^2$) | Transmittance T % at 450 nm | Depolarization | Specific dielectric constant | Leak current (pA) |
|---|---|---|---|---|---|---|
| 4-1 | 70/30 | 100 | 97 | None | 5.1 | 25 |
| 4-2 | 90/10 | 110 | 96 | None | 16 | 27 |
| 4-3 | 95/5 | 200 | 96 | None | 9.8 | 9.0 |
| 4-4 | 90/10 | 60 | 96 | None | 4.2 | 7.5 |
| 4-5 | 90/10 | 100 | 95 | None | 7.2 | 8.5 |

Transmittance: Value at 500 nm thickness.

Example 6

240 parts by weight of propylene glycol monomethyl ether acetate was mixed to 100 parts by weight of a resin obtained by copolymerizing 10 parts by weight of methacrylic acid, 40 parts by weight of glycidyl methacrylate, 10 parts by weight of styrene, 30 parts by weight of tricyclodecanyl methacrylate, and 10 parts by weight of 1,3-butadiene to form a solution. The solution was filtered through a TEFLON® filter of 0.2 μm pore size to form a polymer solution of 33% solid content. Fine TiO$_2$ particles of manufactured by Tayka Corp. used in Example 1 were mixed to the solution so as to provide solid concentration at 50/50 ratio to prepare a solution of a coatable transparent insulating material.

Since the coating material of this example was a material having no photosensitivity by itself, a pattern was formed by using a pattern forming method shown in FIG. 10 of Example 2 after curing under nitrogen at 230° C. for one hour. The specific dielectric constant of the coatable transparent insulating film was 6.8 and the transmittance value was also high as 97% at a wavelength of 450 nm (film thickness: 500 nm). By using the coatable transparent insulating film, image displays could be prepared in the same manner as in Example 2.

Example 7

Example 7 is a high dielectric type organic coating material. 20 parts by weight of 2,3,4-trihydroxy benzophenone-1, 2-naphtoquinone diazide-5-sulfonic acid ester and 30 parts by weight of cyano resin CR-S manufactured by Shin-Etsu Chemical Industry Co. were added to 100 parts by weight of the resin shown in Example 4, dissolved in 360 parts by weight of cyclohexanone, and filtered through a TEFLON® filter of 0.2 μm pore size to form a resist solution. This was evaluated in the same manner as in Example 1. The result is shown in Table 9. While the sensitivity as the photosensitive material was remarkably deteriorated, a transparent coating film was obtained, and a film of a specific dielectric constant of 4.0 or higher was also obtained.

TABLE 9

| No. | Sensitivity D$_0$ (mJ/cm$^2$) | Developing time (s) | Transmittance T % at 450 nm | Depolarization | Specific dielectric constant | Leak current (pA) |
|---|---|---|---|---|---|---|
| 6-1 | 500 | 300 | 95 | None | 8.2 | 40 |

Example 8

The coating material of Example 8 is a non-photosensitive material only consisting of the sol-gel. A coating film of 800 nm was formed by coating an Al$_2$O$_3$ sol-gel manufactured by Pure Chemical Co. Then, heating was conducted in a nitrogen atmosphere at 300° C. for one hour. The specific dielectric constant of the material was 8.0 and the transmittance value was also as high as 98% (for 500 nm film thickness) at a wavelength of 450 nm. Since the coatable transparent insulating film is a material not having photosensitivity, pattern was formed by using the pattern forming method shown in FIG. 6 in Example 2. As a result, by using the coatable transparent insulating film, an image display could be prepared in the same manner as in Example 2.

Then, 5 parts by weight of a photo-acid generator (N-trifluoromethane sulfonyloxy)naphthoyl imide and one part by weight of 9-anthracene methanol were added to Al$_2$O$_3$ sol-gel manufactured by Pure Chemical Co. based on the solid concentration of Al$_2$O$_3$ sol-gel to prepare a photosensitive coatable transparent insulating material (III). This material is a negative type resist in which the sol-gel is condensated by exposure.

The material (III) was coated rotationally and baked at 90° C. for 2 min to form a 700 nm coating film. This was exposed with i-line by way of a mask opposite to the mask of Example 2 in which the pattern portion of the through hole was shielded optionally. Then, after baking at 100° C. for 2 min after exposure, development was conducted by using isoamyl acetate to remove a not-exposed portion to form a pattern. Then, heating was conducted under nitrogen at 300° C. for one hour to form a coatable transparent insulating film. Since this material is a photosensitive, the pattern was formed easily. The specific dielectric constant of the obtained coatable transparent insulating film was 8.0 and the transmittance value was also as high as 98% at a wavelength of 450 nm (500 nm: film thickness). By using the coatable transparent insulating film, the image display could be prepared in the same manner as in Example 2.

Comparative Example 1

Then, for comparing of the effect of the invention, comparative examples are to be described. In Comparative Example 1, own-made fine particles of barium titanate of 50 nm grain size were added to a commercially available heat resistant transparent photosensitive protective film (Optomer PC452 manufactured by JSR) at a mixing ratio of 95/5 (wt %) solid concentration to form a coating film in the same manner as in Example 1. It was found that the coating film was clouded and the transmittance was as low as 50% at a wavelength of 450 nm for the film thickness of 0.5 μm, perhaps due to the agglomeration in barium titanate with the grain size as large as 50 nm and this was not suitable to the purpose of the invention.

Comparative Example 2

Figure 12:
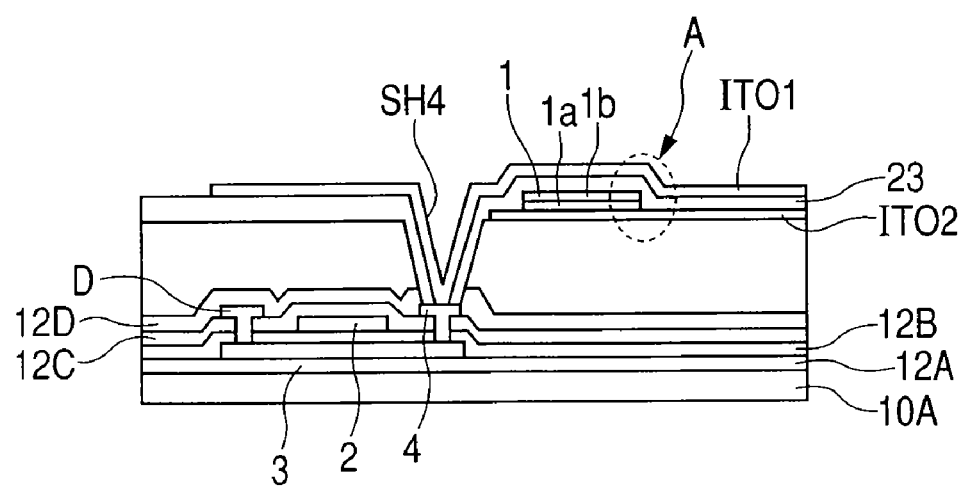
FIG. 12 is a cross sectional view along line B-B' in FIG. 1, like FIG. 4, for explaining Comparative Example 2.

FIG. 12 is a cross sectional view along line B-B' in FIG. 1 in the same manner as FIG. 4 for explaining Comparative Example 2. In FIG. 12, an insulating film formed by a CVD method is formed above a transparent electrode (ITO2) that functions as a counter electrode and a reflection electrode 1 to insulate the counter electrode and the pixel electrode (ITO1). An insulating film 23 formed by a CVD method is formed above the transparent electrode (ITO2) that function as the counter electrode and the reflection electrode 1 to insulate the counter electrode and the pixel electrode (ITO1).

In this case, as shown by arrow A in FIG. 12, since unevenness caused by the reflection electrode 1 can not be planarized, insufficiency of rubbing occurs. Since this generates domains, the contrast is deteriorated.

On the contrary, in the examples of the invention, for example, as shown by arrow B in FIG. 4, the step of the reflection electrode 1 can be absorbed to palanarize the surface of the coatable insulating film 20. This can prevent the domain due to the insufficiency of rubbing and the contrast can be improved.

What is claimed is:

1. A liquid crystal display having a first substrate and a second substrate which are arranged with main surfaces thereof opposed to each other, and liquid crystals sandwiched in the gap between the main surfaces of the first substrate and the second substrate, in which
    an active device is formed on the main surface of the first substrate, a first insulating film, a first electrode, a second insulating film, and a second electrode are stacked in this order in the layers above the active device,
    the second insulating film is a coatable transparent insulating film having a specific dielectric constant of 4.0 or higher,
    the first insulating film has a first contact hole,
    the second insulating film is formed between the first electrode and the second electrode and in the inside of the first contact hole,
    a second contact hole is present to the second insulating film in the inside of the first contact hole,
    the second electrode constitutes a pixel electrode comprising a transparent electrode electrically connected by way of the second contact hole to the active device, and
    a storage capacitance of a pixel is formed by the first electrode, the second electrode, and the second insulating film,
    wherein the second insulating film includes a transparent film constituting a main portion thereof and fine particles having a specific dielectric constant higher than that of the material for the transparent film.

2. A liquid crystal display according to claim 1, wherein the grain size of the fine particle having the specific dielectric constant higher than that of the transparent film material is 30 nm or less.

3. A liquid crystal display according to claim 1, wherein the fine particle having a specific dielectric constant higher than that of the transparent film material comprises a material of one member or a mixture of two or more members of titanium oxide, barium titanate, aluminum oxide, tantalum oxide, zirconium oxide, hafnium oxide, niobium oxide, and yttrium oxide.

4. A liquid crystal display according to claim 1, wherein the second insulating film is formed of a transparent film comprising a main portion thereof and a sol-gel having a specific dielectric constant higher than that of the transparent film material.

5. A liquid crystal display according to claim 4, wherein the sol-gel having a specific dielectric constant higher than that of the transparent film material is a material of one member or a mixture of two or more of members of titanium oxide, barium titanate, aluminum oxide, tantalum oxide, zirconium oxide, hafnium oxide, niobium oxide, and yttrium oxide.

6. A liquid crystal display according to claim 1, wherein the transparent film constituting a main portion of the second insulating film is a material containing a polymer selected from polyacrylate derivatives, polymethacrylate derivatives, polystyrene derivatives, polyolefin derivatives, and copolymers thereof.

7. A liquid crystal display according to claim 1, wherein the transparent film constituting a main portion of the second insulating film is a material having a photosensitivity.

8. A liquid crystal display according to claim 1, wherein the thickness of the second insulating film is 100 nm or more and 1,000 nm or less.

9. A liquid crystal display according to claim 1, wherein the second insulating film has a transmittance of 90% or more at a wavelength of 450 nm or more and 800 nm or less.

10. A liquid crystal display according to claim 1, wherein the first electrode is a transparent electrode.

11. A liquid crystal display according to claim 1, wherein the first electrode is a reflection electrode.

12. A liquid crystal display according to claim 11, wherein the reflection electrode has unevenness.

13. A liquid crystal display according to claim 1, wherein the first electrode comprises a transparent electrode and a reflection electrode.

14. A liquid crystal display according to claim 1, wherein the first electrode is a counter electrode, and the liquid crystals are driven by an electric field generated by the first electrode and the second electrode.

15. A liquid crystal display according to claim 14, wherein the first electrode has a slit.

16. A liquid crystal display according to claim 1, wherein the second substrate has a counter electrode and the liquid crystals are driven by an electric field generated by the counter electrode and the second electrode.

17. A liquid crystal display according to claim 1, wherein a third insulating film is present between the first electrode and the second electrode.

18. A liquid crystal display according to claim 1, wherein the second insulating film has a planar surface.

\* \* \* \* \*